Jan. 21, 1969  L. E. LEFEVRE  3,423,498
METHOD OF PRODUCING COLORED PLASTIC FILM OR SHEET
Filed Sept. 20, 1965
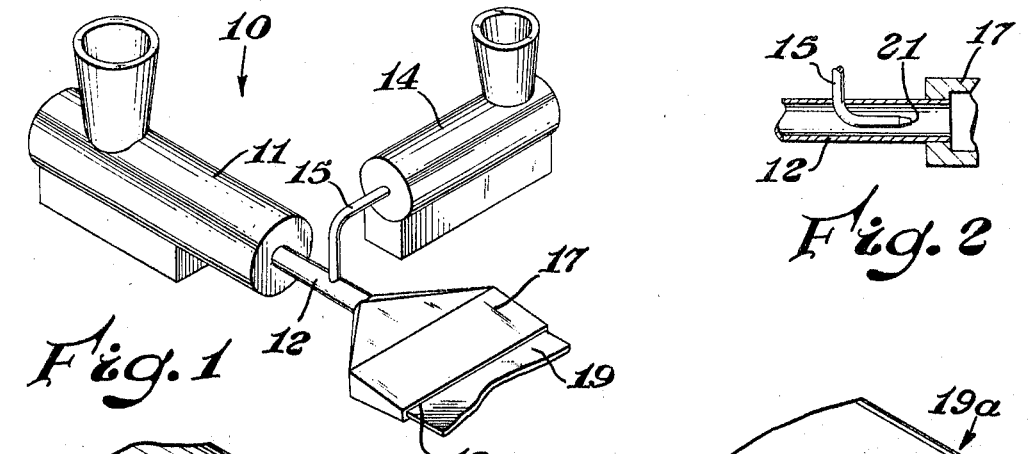
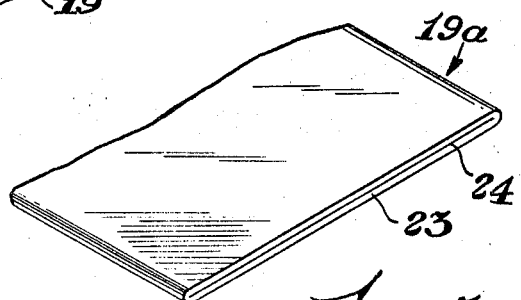
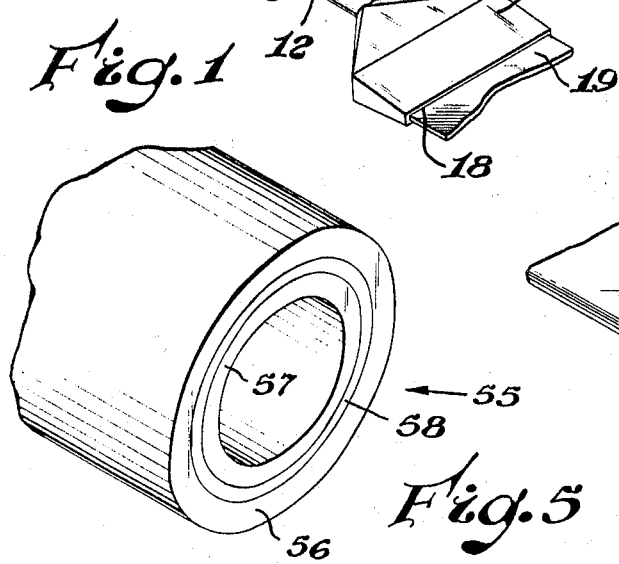
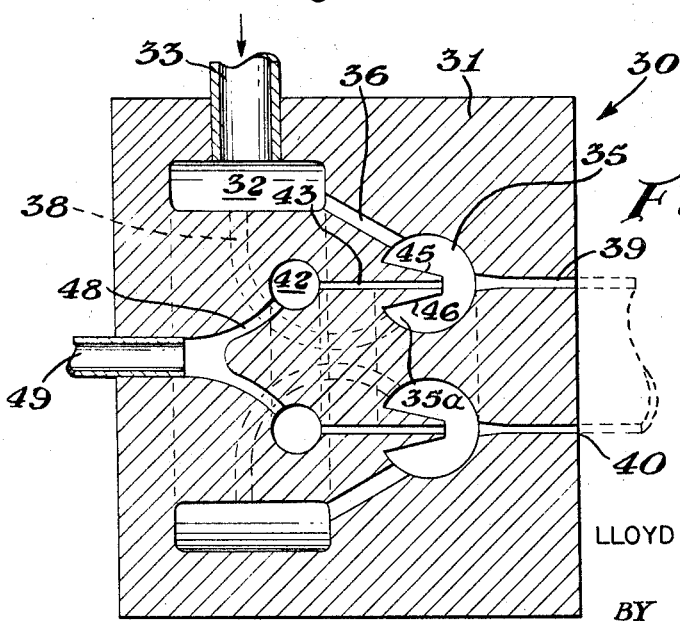
INVENTOR.
LLOYD EDWARD LEFEVRE
BY *Robert B. Ingraham*
AGENT

United States Patent Office 3,423,498
Patented Jan. 21, 1969

3,423,498
METHOD OF PRODUCING COLORED PLASTIC FILM OR SHEET
Lloyd Edward Lefevre, Bay City, Mich., assignor to The Dow Chemical Company, Midland, Mich., a corporation of Delaware
Filed Sept. 20, 1965, Ser. No. 488,574
U.S. Cl. 264—171          5 Claims
Int. Cl. B29f 3/12

---

ABSTRACT OF THE DISCLOSURE

Colored film and sheeting are prepared by simultaneous extrusion of a transparent outer layer and a colored inner layer. Color changes are more readily accomplished than if the entire plastic material is colored.

---

This invention relates to a method for preparing plastic film and more particularly relates to a method for producing colored plastic film with a minimum of waste product.

Colored plastic film or sheet is particularly desirable for many applications, both decorative and utilitarian. However, oftentimes the cost of producing particular colors is excessive because of the necessity of completely removing one color when transparent film or sheet is required or removing sufficient colored material from the fabrication equipment when changing to another color. In the preparation of synthetic resinous thermoplastic sheet in relatively large quantities it is oftentimes impractical to produce a product other than a transparent film as the market is limited for a particular color and the cost of purging the production system for production runs of less than perhaps several weeks duration renders such colored film or sheet impractical. Many polymer handling systems in large scale operations cannot be completely purged or cleaned within a reasonable length of time without disassembly. Oftentimes the changing over from one product to another will result in a scrap loss and time loss that is totally impractical.

It would be advantageous if there were available a method for the production of colored plastic film by an extrusion technique which would permit the rapid and economic alteration of the color of the product.

It would be further advantageous if there were available a method for the production of synthetic resinous thermoplastic film by an extrusion technique which would permit the preparation of large quantities of transparent or colored film or sheet and would require a minimal length of time and involve a minimal quantity of scrap material.

It would be further advantageous if such a method would permit the preparation of colored transparent or opaque colored material or transparent sheet or film at will.

These benefits and other advantages in accordance with the method of the invention are achieved in a method of extruding a synthetic resinous thermoplastic film which comprises providing a first stream of heat plastified transparent synthetic resinous material, extruding the heat plastified stream to form a synthetic resinous sheet-like body improvement which comprises providing a second stream of a colored synthetic resinous material disposed entirely within the first stream.

Further features, benefits and advantages of the invention will become apparent from the following specification taken in connection with the drawings wherein:

FIGURE 1 schematically represents an apparatus for the preparation of a film or sheet employing the method of the invention.

FIGURE 2 is a sectional view of a portion of the apparatus of FIGURE 1.

FIGURE 3 is an enlarged exaggerated end view of a product prepared by the apparatus of FIGURE 1.

FIGURE 4 is a schematic sectional representation of a die for producing a tubular product employing the method of the invention, and FIGURE 5 shows an enlarged schematic representation and the product of the die of FIGURE 4.

In FIGURE 1 there is schematically illustrated an apparatus generally designated by the reference numeral 10 particularly adapted for the practice of the method of the invention. The apparatus 10 comprises in cooperative combination a first extruder 11 for the extrusion of synthetic resinous thermoplastic material. The extruder 11 has a discharge conduit 12, a second extruder 14 having a discharge conduit 15 is adapted to provide a minor stream of a heat plastified synthetic resinous material. The conduit 15 terminates within the conduit 12 in a manner depicted in FIGURE 2. A sheeting die 17 is in operative communication with the conduit 12, and receives the flow therefrom which discharged from a sheet-like extrusion orifice 18 to form the sheet 19.

In FIGURE 2, there is illustrated a sectional view of a portion of the apparatus 10, showing the relative configuration of the conduit 12, the die 17 and the conduit 15. The conduit 15 terminates in an orifice or discharge opening 21, which is directed toward the die 17 and within the conduit 12.

In FIGURE 3, there is illustrated an enlarged schematic representation of a sheet or film 19a prepared by the apparatus depicted in FIGURES 1 and 2. The sheet 19a comprises a transparent polymeric layer 23 and a generally centrally disposed colored polymeric layer 24 generally coextensive with and completely encapsulated within the layer 23.

In accordance with the method of the present invention, the extruder 11 is operated to provide a major or first stream of a heat plastified transparent, colorless synthetic resinous material in the conduit 12. The extruder 14 provides a second or minor stream a colored synthetic resinous material in heat plastified condition through the conduit 15. Beneficially the extruders 11 and 14 are of sizes commensurate with the amount of heat plastified material required therefrom. Thus, the extruder 11 is much larger than the extruder 14. As the conduit 15 of the extruder 14 terminates within the conduit 12 at the orifice 21 a coaxial stream is formed, wherein the transparent material of the first or major stream totally encapsulates the coloring material of the second or minor stream. The resultant composite stream passes into the die 17, wherein it is deformed into a generally sheet-like configuration and is extruded at an appropriate temperature from the extrusion orifice 18 of the die 17 as the composite sheet 19 of FIGURE 1, resulting in a product generally similar to the sheet 19a of the FIGURE 3, wherein the thickness of the final product has been greatly exaggerated in order to show the relationship of the colored layer to the transparent envelope or sheet.

Beneficially the feed material extruded by the small or minor extruder 14 may be a color concentrate which, if pigments are employed, may be loaded or filled to an extent much greater than that which would give a desirable finish to the outer surface of the film and yet provide the desired appearance to the product. If the transparent colored films are desired, dyes are employed in the color concentration whereas if opaque film is required, pigments may be used alone or with dyes in admixture with an opacifier such as titanium dioxide, calcium carbonate or the like. When it is desired to produce clear film, the extrusion rate of the major extruder 11 is reduced, the output rate of the minor extruder is increased and purged with transparent material. Similarly in changing colors the small extruder is purged with a colored material which is desired.

Thus, it is necessary only to purge a small extruder or extrusion system rather than the total extrusion capacity employed in preparing the product. The amount of the product required for the purging is substantially reduced as the output of the major extruder 11 is reduced to provide only sufficient polymeric material to provide a heat plastified sheet about the material issuing from the orifice 21. Thus, the extruded sheet, during the purging, is being extruded at a relatively low rate. The major portion of the material, coming from the minor extruder and the minor and outer portion coming from the major extruder. At no time does the product of the minor extruder come in contact with the die, therefore, substantially reducing the quantity of material and facilitating a color change and minimizing down time.

In FIGURE 4 there is illustrated an alternate die generally designated by the reference numeral 30, for the use and practice of the method of the invention, the die 30 comprises a housing 31 defining therein a first annular passageway or chamber 32, a generally radial passageway 33 adapted to be in communication with a major extruder such as the extruder 11 of FIGURE 1, a second annular chamber 35, a plurality of passageways 36 providing communication between the annular chamber 32 and the second annular chamber 35. The housing 31 also defines a plurality of passageways 38 providing communication between the first annular chamber 32 and a centrally disposed portion 35a of the annular chamber 35. The passageway 38 terminates toward the outer portion of the chamber 35 and the passageway 38 terminates toward the innermost portion of the chamber 35. The housing 31 defines a generally annular extrusion passageway 39 communicating with the annular chamber 35 and terminating an extrusion orifice 40. A third annular chamber 42 is defined within the housing 31, the housing 31 defines a second annular passageway 43 which communicates with the annular chamber 35. The housing 31 defines a pair of internal die lips 45 and 46 terminating well within the chamber 35. A plurality of passageways 48 are defined within the housing 31, a generally central passageway 49 is in communication with the passageways 48 which provide communication between the passageway 49 and the annular chamber 42. The passageway 49 is adapted to be in communication with a minor extruder such as the extruder 14 of FIGURE 1.

In operation of the apparatus of FIGURE 4, in accordance with the method of the present invention, a major flow of heat plastified synthetic resinous material is supplied to the passageway 33, the heat plastified material enters the annular chamber 32 and passes therefrom by means of the passageways 36 and 38. The chamber 35 is filled and material issues from the extrusion orifice 40 in the form of a tube.

In FIGURE 5 there is illustrated a tube generally designated by the reference numeral 55 which is produced by the method of the invention when employing the embodiment of FIGURE 4. The tube 55 comprises an outer layer 56 and an inner layer 57, of like material, and an intermediate layer 58.

By way of further illustration a polystyrene extruder having an extrusion capacity of about 300 pounds per hour and an extruder having a capacity of about 50 pounds per hour are connected to a sheeting die in a manner illustrated in FIGURE 1, wherein the discharge of the smaller extruder is coaxially disposed with relationship to the discharge of the large extruder. Polystyrene is extruded from the large extruder at a rate of 200 pounds per hour and the smaller extruder at a rate of about 25 pounds per hour. Clear transport resin is used in both instances. Feedstock is changed from clear polystyrene to a polystyrene containing 20 weight percent of finely divided titanium dioxide. After a period of 4 minutes the transparent sheet issuing from the extrusion die is uniformly white over a major portion thereof. The feedstock to the small extruder is changed to clear polystyrene and the extrusion rate increased to 50 pounds per hour while the extrusion rate of the large extruder is reduced to about 40 pounds per hour. After a period of 14 minutes, clear polystyrene only issued from the die.

Similar beneficial and advantageous results are obtained when the smaller extruder is fed with a polystyrene containing ½ percent by weight of a dye Calco Chiniline Yellow ZSS Color Index Number CI 47,000. Similar advantageous and beneficial results are achieved when clear polyethylene is utilized in the larger extruder and pigmented polyethylene is employed in the smaller extruder. Advantageously the products obtained have a high gloss surface which generally is in excess of that which is obtained when a pigmented polymer is extruded. Beneficially by varying the pigmentation or dye content of the inner layer, that is the material fed to the smaller extruder control of the optical density is achieved.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

I claim:

1. In a method for the extrusion of colored synthetic resinous thermoplastic film or sheeting wherein a colored layer is encapsulated within a generally transparent outer layer, the steps of the method comprising:

heat plastifying a first synthetic resinous material, the first synthetic resinous material being transparent, passing the first heat plastified material into a die cavity having an internal surface and an extrusion orifice, discharging the first stream from the extrusion orifice in the form of film or sheeting, the improvement which comprises:

introducing into the first stream, prior to discharging, a colored stream of a first colored heat plastified material having a different appearance from the first stream, maintaining the first stream in contact with the internal surface while maintaining the first colored stream in spaced relationship to the internal surface by means of the first stream, disposing the first colored stream generally parallel to and coextensive with a major surface of the first stream as the combined first and second streams are passed from the extrusion orifice, extruding a desired quantity of film or sheeting, reducing the rate of flow of the first stream, altering the material of the colored stream by replacing the first colored material with a second colored material, causing the second colored material to flow until portions of the first colored material are no longer discharged from the die, and subsequently increasing the rate of flow of the first stream.

2. The method of claim 1 wherein the extruded stream has a generally cylindrical configuration.

3. The method of claim 1 wherein the second stream is opaque.

4. The method of claim 1 wherein the first stream and the second stream have a generally cylindrical configuration and are subsequently deformed in a slot die to form a sheet-like configuration.

5. The method of claim 1 wherein the first stream has a generally annular configuration and the second stream is annularly disposed within the first stream.

References Cited

UNITED STATES PATENTS

| | | | |
|---|---|---|---|
| 3,223,761 | 12/1965 | Raley | 264—95 |
| 3,274,646 | 9/1966 | Krystof | 18—13 |
| 3,321,804 | 5/1967 | Breidt et al. | 18—13 |

FOREIGN PATENTS 985,310  3/1965  Great Britain.

ROBERT F. WHITE, *Primary Examiner.*

G. AUVILLE, *Assistant Examiner.*

U.S. Cl. X.R.

18—13; 264—173